(12) United States Patent
Lindemann et al.

(10) Patent No.: US 9,279,459 B2
(45) Date of Patent: Mar. 8, 2016

(54) FRICTION PLATE WITH COMPRESSED OVERLAPPING SECTIONS

(71) Applicant: Schaeffler Technologies AG & Co. KG, Herzogenaurach (DE)

(72) Inventors: Patrick Lindemann, Wooster, OH (US); Rashid Farahati, Copley, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 93 days.

(21) Appl. No.: 14/088,664

(22) Filed: Nov. 25, 2013

(65) Prior Publication Data

US 2014/0144746 A1    May 29, 2014

Related U.S. Application Data

(60) Provisional application No. 61/730,406, filed on Nov. 27, 2012.

(51) Int. Cl.
*F16D 13/64* (2006.01)
*F16D 69/04* (2006.01)

(52) U.S. Cl.
CPC ...... *F16D 13/648* (2013.01); *F16D 2069/0458* (2013.01); *F16D 2069/0466* (2013.01); *Y10T 156/10* (2015.01)

(58) Field of Classification Search
CPC ............... F16D 2069/0466; F16D 2250/0061; F16D 2250/0069
See application file for complete search history.

(56) References Cited

U.S. PATENT DOCUMENTS

| 4,747,473 A | * | 5/1988 | Bok et al. ............... F16D 65/121 |
| | | | 188/73.2 |
| 6,045,644 A | | 4/2000 | Don et al. |
| 6,585,096 B2 | | 7/2003 | Fujita |
| 7,165,664 B2 | | 1/2007 | Suzuki et al. |
| 7,798,301 B2 | | 9/2010 | Keating et al. |
| 2004/0079595 A1 | * | 4/2004 | Fabricius et al. ............ 188/71.5 |
| 2014/0124326 A1 | * | 5/2014 | Farahati et al. .......... 192/107 M |

FOREIGN PATENT DOCUMENTS

| EP | 1118394 A2 | 7/2001 |
| JP | 61144285 A | 7/1986 |
| KR | 100622524 B1 | 9/2006 |

OTHER PUBLICATIONS

International Search Report for PCT/US2013/072032, mailed Mar. 14, 2014 by Korean Intellectual Property Office.

* cited by examiner

*Primary Examiner* — Richard Lorence
(74) *Attorney, Agent, or Firm* — Davidson, Davidson & Kappel, LLC

(57) ABSTRACT

A friction material part is provided. The friction material part includes a first segment and a second segment, an end of the first segment overlapping an end of the second segment to form a joint that is compressed more than intermediate portions of the first and second segments. A method for manufacturing a friction material part is also provided. The method includes overlapping an end of a first friction material segment and an end of a second friction material segment; and compressing the overlapped ends to form a compressed joint.

19 Claims, 3 Drawing Sheets

FRICTION PLATE WITH COMPRESSED OVERLAPPING SECTIONS

This claims the benefit to U.S. Provisional Patent Application No. 61/730,406, filed on Nov. 27, 2012, which is hereby incorporated by reference herein.

The present invention relates to friction clutches and plates, and more particularly to a wet-type friction clutch with a plurality of friction plates, each plate having a segmented friction material. Such friction clutches may be uses for example in motor vehicle transmissions.

BACKGROUND

The friction material in wet-type friction clutches generally operates in an oil submerged environment and is often paper-based material used to form friction material rings. To reduce waste during manufacture, the wet friction material ring may be stamped out in segments and then bonded to the plate to form the friction material rings. However, the edges between the segments can cause premature material failure and reduce the life of the wet friction material. One reason for premature material failure is due in part to the ability of fluid to enter the uncompressed edge of the cut joint.

U.S. Pat. No. 6,585,096 describes a joint with reduced thickness and U.S. Pat. No. 7,165,664 has a depressed flat area at the joint.

SUMMARY OF THE INVENTION

Highly compressing the entire segment at the joint can improve durability, but the reduced thickness caused by compressing at the joint also can lead to fluid flow between the inner diameter and the outer diameter of the friction material ring and cause some oil leakage during engagements.

The present invention provides a friction material part comprising a first segment and a second segment, an end of the first segment overlapping an end of the second segment to form a joint that is compressed more than intermediate portions of the first and second segments.

The present invention also provides a method for manufacturing a friction material part comprising overlapping an end of a first friction material segment and an end of a second friction material segment; and compressing the overlapped ends to form a compressed joint.

BRIEF DESCRIPTION OF THE DRAWINGS

The present invention will be further described in a non-limiting manner on the basis of the drawing of preferred embodiments in which.

DETAILED DESCRIPTION

Figure 1A:
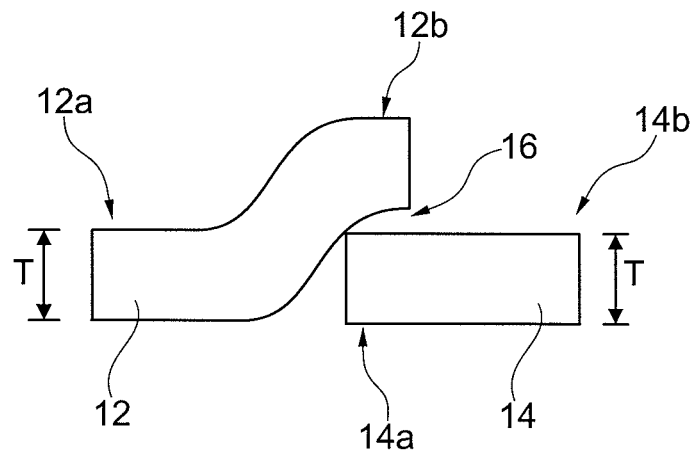
FIGS. 1a, 1b and 1c show schematically a process of forming a friction material part according to one embodiment of the present invention.
Figure 1B:
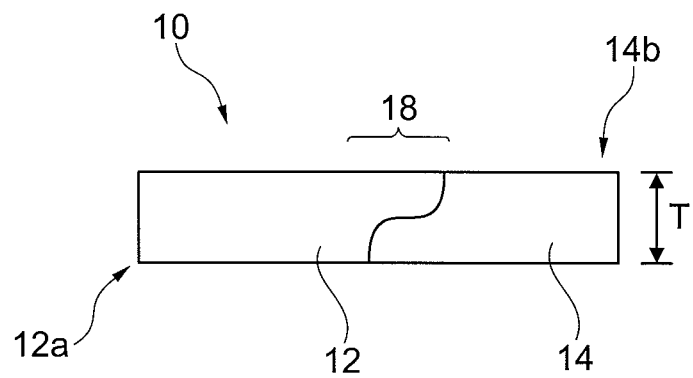
Figure 1C:
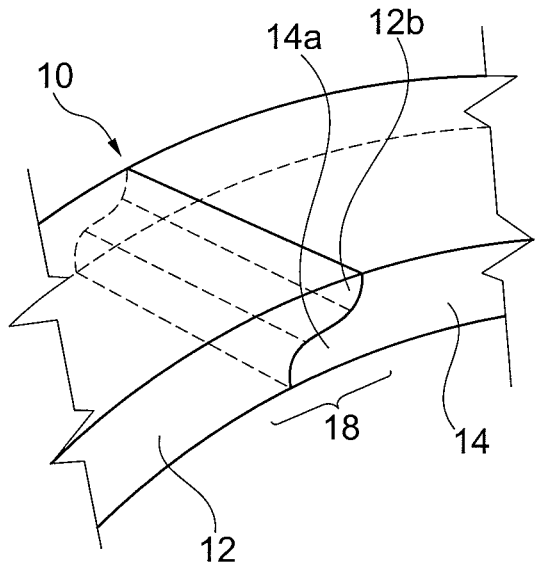

FIGS. 1a, 1b and 1c show schematically a process of forming a friction material part 10 according to one embodiment of the present invention. In one preferred embodiment, friction material part 10 is made of a fibered textile composite friction lining. As shown in a schematic side view in FIG. 1a, two separate friction material segments 12, 14 each included respective first ends 12a, 14a and second ends 12b, 14b. Friction material segments 12, 14 are aligned such that second end 12b and first end 14a overlap each other, with second end 12b being on top of first end 14a. In this preferred embodiment, friction material segments 12, 14 are of the same thickness T and both friction material segments 12, 14 are of a uniform thickness throughout their length. Friction material segments 12, 14 may include glue or another adhesive on their entire lower surfaces. For example, friction material segments 12, 14 may be cut from a roll of friction material and the adhesive may applied to the back of the entire material strip, usually before the entire material strip is cut into segments 12, 14 from the roll of friction material (i.e., the roll of friction material is unwrapped, adhesive is applied to the back side, then each segment is cut out and applied to the plate, on for example base 120 shown in FIG. 2). In one alternative embodiment, the adhesive may be applied to the plate itself. Overlapping ends 12b, 14a may then be bonded together at a bonding area 16 by highly compressing the overlapping ends 12b, 14a as they are joined by the adhesive to form friction material part 10 shown in a schematic side view in FIG. 1b and in a schematic perspective view in FIG. 1c. In alternative embodiments, overlapping ends 12a, 14b may highly compressed before or after they are bonded by the adhesive. Overlapping ends 12a, 14b may be highly compressed, for example by stamping using a die, so that joint 18 is made of highly compressed friction material by flattening overlapping ends 12a, 14b. The separate friction material segments 12, 14 may be compressed to a degree before they are brought together, bonded and highly compressed. Accordingly, as used herein, highly compressed describes a degree of compression that is greater than the degree of compression, if any, of the separate friction material segments 12, 14 before they are brought together.

Friction material segment 10 has two ends 12a, 14b, with ends 12b, 14a of friction material segments 12, 14 being bonded to form joint 18. In this embodiment, friction material part 10 has a uniform thickness, with ends 12a, 14b having the same thickness as joint 18. The compressing of ends 12b, 14a during the bonding of friction material segments 12, 14 provides a durable joint 18, while the uniform thickness of friction material part 10 may prevent fluid from flowing across friction material segment at joint 18.

The thick compressed joint 18 in this embodiment thus can provide friction area to reduce unit pressure for a friction plate, while also aiding in preventing oil seepage between an inner diameter ID and an outer diameter OD.

Figure 2:
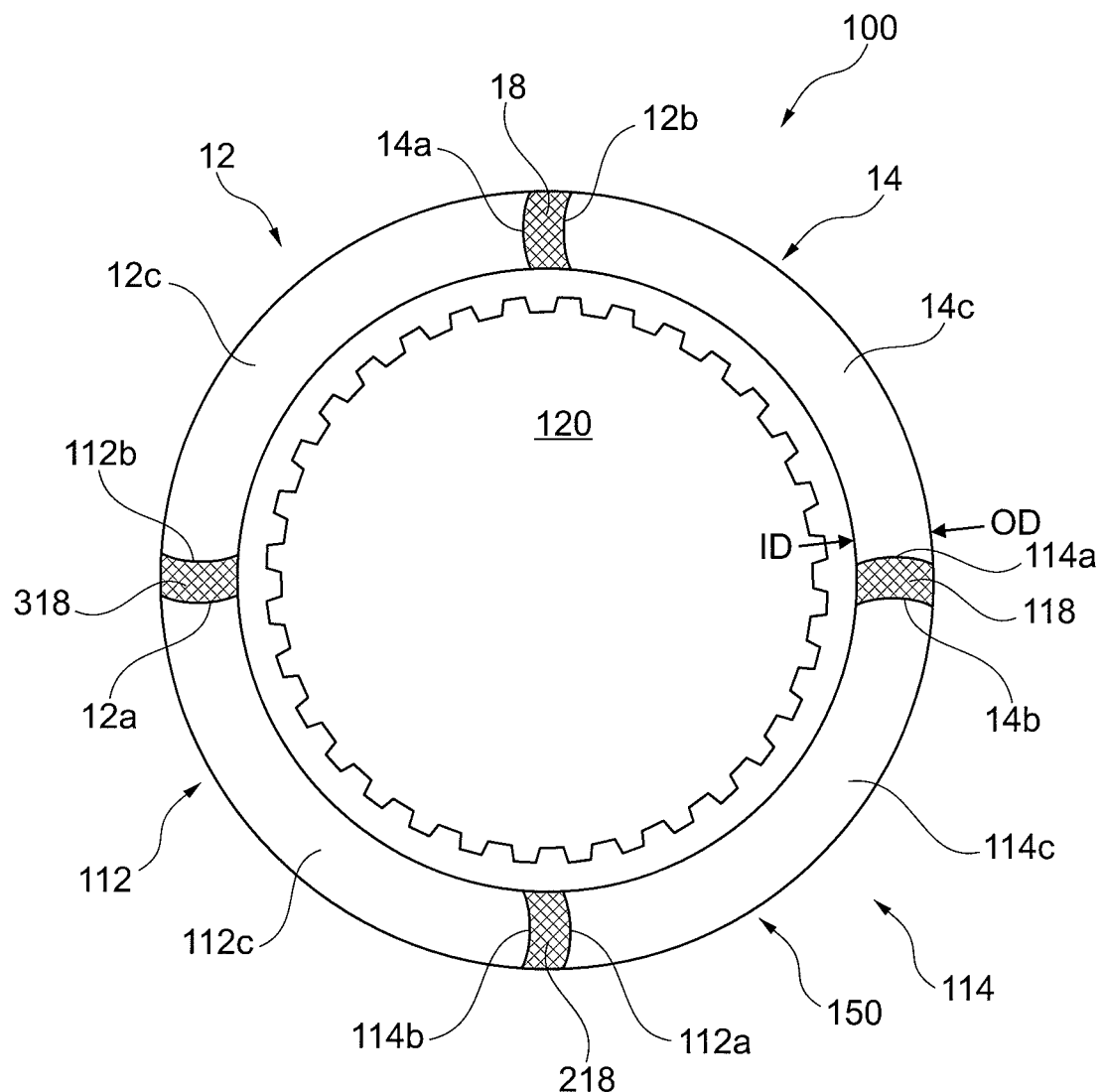
FIG. 2 shows a friction plate comprising four of the segments shown in the embodiment of FIGS. 1a, 1b and 1c.

As shown for example in FIG. 2, friction plate 100 comprises a base 120, for example a plate made of metal, and a friction surface formed of four segments, including segments 12, 14 shown in the embodiment of FIGS. 1a, 1b, 1c and two other segments 112, 114 similar to segments 12, 14. Segments 12, 14, 112, 114 are bonded to adjacent segments to form friction ring 150 having four joints 18, 118, 218, 318. Both ends of each segment 12, 14, 112, 114 are highly compressed at the corresponding joints 18, 118, 218, 318 and bonded together with adhesive. These segments 12, 14, 112, 114 can for example be glued or otherwise adhered to base 120 to form friction ring 150 of friction plate 100. The ends of segments 12, 14, 112, 114 can be curved to fit together as shown, although other edge shapes are possible such as interlocking edges.

In a preferred embodiment, segments 12, 14, 112, 114 may be aligned in a ring shape with ends of segments 12, 14, 112, 114 overlapping with ends of adjacent segments. For example, ends 14a, 12b overlap each other as shown in FIG. 1a, and in a similar manner, ends 114a, 14b overlap each other, ends 112a, 114b overlap each other and ends 12a, 112b overlap each other. Adhesive may be placed 12, 14, 112, 114 on segments as described above with respect to segments 12, 14. The overlapping ends may then all be compressed, for example by stamping using a die, at the same time so that ends 14a, 12b form joint 18, ends 114a, 14b form joint 118, ends 112a, 114b form joint 218 and ends 12a, 112b form joint 318 simultaneously and the overlapping ends are flattened. In alternative embodiments, joints 18, 118, 218, 318 may be formed sequentially or joints 18, 118, 218, 318 may be formed in pairs. Also, in further embodiments, the ends may be overlapped and brought together by adhesive sequentially, then compressed together at the same time.

In a preferred embodiment, after highly compressed joints 18, 118, 218, 318 are formed and segments 12, 14, 112, 114 are bonded together to form friction ring 150, friction ring 150 has a uniform thickness. Flow between outer diameter OD and inner diameter ID is thus blocked by or reduced by joints 18, 118, 218, 318, which may provide improved durability. As noted above, in this preferred embodiment, segments 12, 14, 112, 114 are of the same uniform thickness before being joined and compressed. Accordingly, ends of segments 12, 14, 112, 114 are compressed by approximately fifty percent on average to form joints 18, 118, 218, 318, making the ends of segments 12, 14, 112, 114 approximately twice as dense as intermediate portions 12c, 14c, 112c, 114c extending between joints 18, 118, 218, 318. In alternative embodiments, segments 12, 14, 112, 114 may not be of uniform thickness. For example, depending on the desired compression and density of ends 12a, 12b after bonding to form joints 18, 318, segment 12 may be formed such that ends 12a, 12b are thicker or thinner than intermediate portion 12c before ends 12a, 12b are highly compressed. If joints 18, 318 and correspondingly ends 12a, 12b are desired to be less than twice as dense as intermediate portion 12c, ends 12a, 12b may be thinner than intermediate portion 12c before ends 12a, 12b are overlapped with ends 112b, 14a, respectively, and flattened. If joints 18, 318 and correspondingly ends 12a, 12b are desired to be more than twice as dense as intermediate portion 12c, ends 12a, 12b may be thicker than intermediate portion 12c before ends 12a, 12b are overlapped with ends 112b, 14a, respectively, and flattened.

Figure 3:
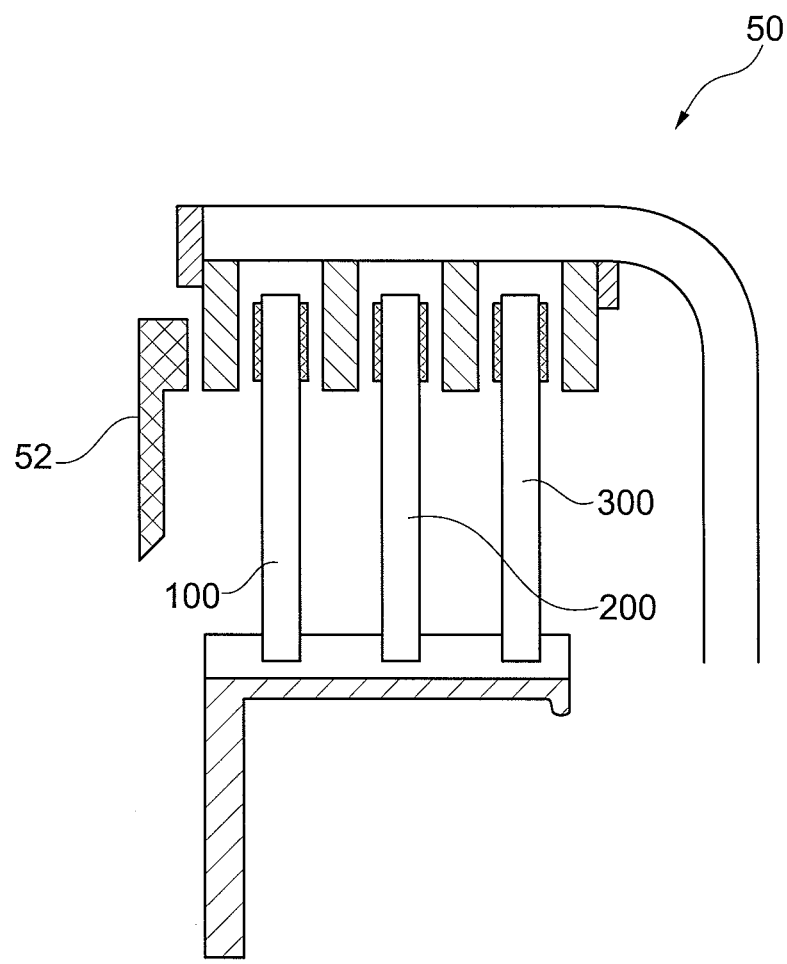
FIG. 3 shows schematically a friction clutch with a plurality of the friction plates shown in FIG. 2.

FIG. 3 shows schematically a wet-type friction clutch 50 of a motor vehicle transmission having a plurality of friction plates 100, 200, 300, with friction plates 200, 300 being similar to friction plate 100 as described in FIG. 2 for example. The axially-movable plates 100, 200, 300 can be pressed against axially-movable separator plates by a piston 52, for example a hydraulically-actuated piston, to provide frictional engagement.

The highly compressed ends can be manufactured by compressing the ends of a friction material segment while leaving a further part of the friction material segment uncompressed. While two or more segments may be used to form a ring, preferably at least four are used to form a ring. Other embodiments are within the scope of the claims.

What is claimed is:

1. A friction material part comprising:
   a first segment and a second segment, each of the first and second segment including an inner diameter, an outer diameter, a top arcuate surface extending between the respective inner diameter and the outer diameter, and a bottom arcuate surface extending between the respective inner diameter and the outer diameter, an end of the first segment overlapping an end of the second segment with the bottom arcuate surface of the end of the first segment being on top of and contacting the top arcuate surface of the end of the second segment to form a joint that is compressed more than intermediate portions of the first and second segments.

2. The friction material part as recited in claim 1 wherein the compressed joint is approximately as thick as the intermediate portions of the first and second segments.

3. The friction material part as recited in claim 2 wherein the compressed joint is denser than the intermediate portions of the first and second segments.

4. The friction material part as recited in claim 3 wherein the compressed joint is approximately twice as dense as the intermediate portions.

5. The friction material part as recited in claim 1 wherein the overlapping ends are bonded together at the compressed joint by an adhesive.

6. The friction material part as recited in claim 1 wherein the friction material part is made out of a fibered textile composite friction lining.

7. The friction material part as recited in claim 1 wherein the friction material part is arc-shaped.

8. The friction material part as recited in claim 1 wherein the friction material part has a ring shape.

9. The friction material part as recited in claim 1 further comprising at least one further segment, a second end of the first segment overlapping a first end of the at least one further segment to form a second compressed joint, a second end of the second segment overlapping a second end of the at least one further segment to form a third compressed joint.

10. The friction material part as recited in claim 9 wherein the at least one further segment includes a third segment and a fourth segment, a first end of the third segment forming the first end of the at least one further segment, a first end of the fourth segment forming the second end of the at least one further segment, a second end of the third segment and a second end of the fourth segment overlapping to form a fourth compressed joint.

11. A friction plate comprising:
   a base and plurality of friction material segments attached to the base to form a friction material ring, two friction material segments of the plurality of friction material segments being formed by the friction material part as recited in claim 1, at least a portion of the bottom arcuate surfaces of the first and second friction material segments contacting the base.

12. The friction plate as recited in claim 11 wherein the compressed joint is approximately as thick as intermediate portions of the first and second segments.

13. The friction plate as recited in claim 12 wherein the compressed joint is denser than the intermediate portions of the first and second segments.

14. The friction plate as recited in claim 11 wherein the overlapping ends are bonded together at the compressed joint by an adhesive.

15. A wet-type friction clutch comprising:
   at least one friction plate as recited in claim 11.

16. A method for manufacturing a friction material part comprising:
   providing a first friction material segment and a second friction material segment, each of the first and second segment including an inner diameter, an outer diameter, a top arcuate surface extending between the respective inner diameter and the outer diameter, and a bottom arcuate surface extending between the respective inner diameter and the outer diameter;
   overlapping an end of a first friction material segment and an end of a second friction material segment by placing the bottom arcuate surface of the end of the first segment on top of and contacting the top arcuate surface of the end of the second segment; and compressing the overlapped ends to form a compressed joint.

17. The method as recited in claim 16 wherein the compressing includes bonding the first friction material segment and the second material segment to form the friction material part.

18. The method as recited in claim 16 wherein the compressing includes flattening the overlapping ends to a level of intermediate portions of the first and second friction material segments.

19. The method as recited in claim 16 wherein the compressed joint is denser than intermediate portions of the first and second friction material segments.

* * * * *